No. 723,152. PATENTED MAR. 17, 1903.
A. GÜRBER.
PROCESS OF CONCENTRATING SOLUTIONS.
APPLICATION FILED JAN. 30, 1900.
NO MODEL.
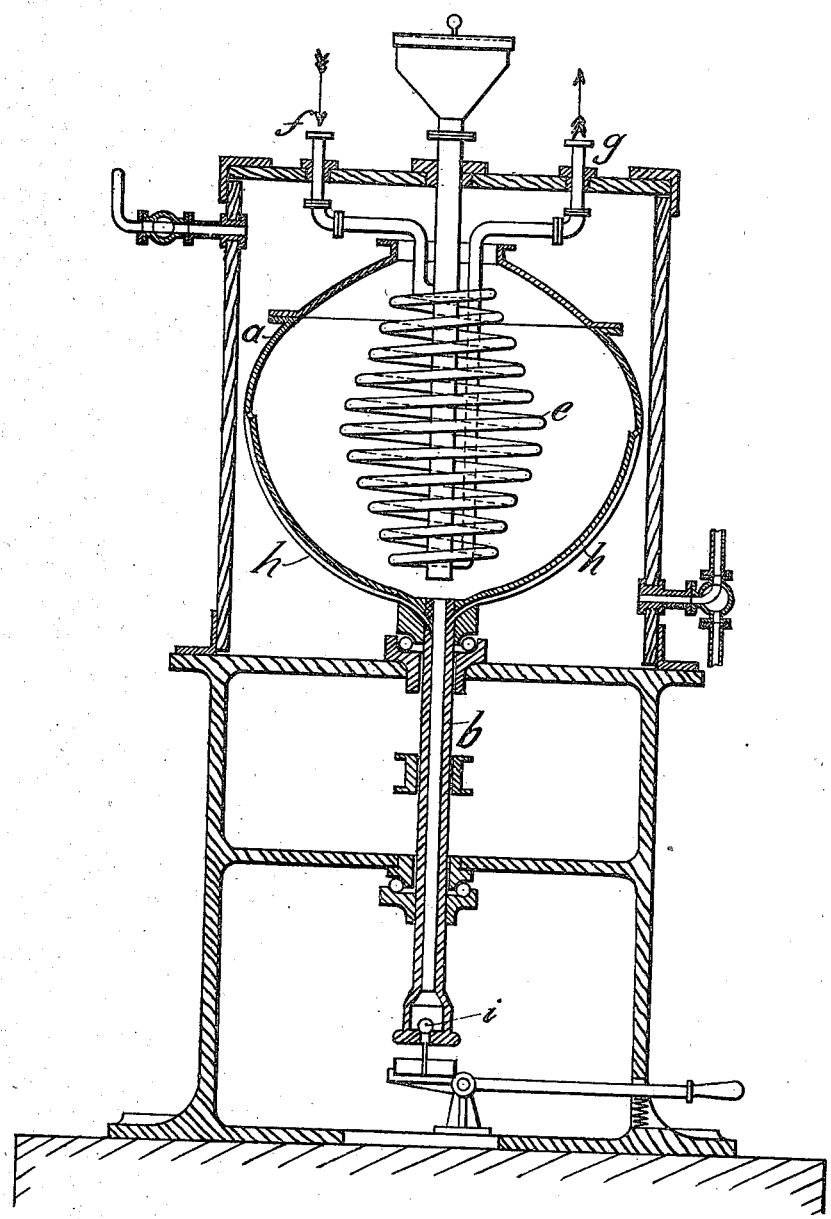

UNITED STATES PATENT OFFICE.

AUGUST GÜRBER, OF WÜRZBURG, GERMANY.

PROCESS OF CONCENTRATING SOLUTIONS.

SPECIFICATION forming part of Letters Patent No. 723,152, dated March 17, 1903.

Application filed January 30, 1900. Serial No. 3,340. (No specimens.)

*To all whom it may concern:*

Be it known that I, AUGUST GÜRBER, a citizen of Switzerland, residing at Würzburg, in the Kingdom of Bavaria, Germany, have invented certain new and useful Improvements in Processes of Concentrating Solutions, (for which I have applied for a patent in Germany, dated July 15, 1899; in Denmark, dated August 19, 1899; in England, dated August 24, 1899, and in France, dated September 11, 1899,) of which the following is a specification.

The product hitherto known to the trade as "condensed milk" has the disadvantage of an unnatural taste, as well as a peculiar odor, both of which are due to the methods of concentrating the same by evaporation as usually employed. Ordinarily the milk is subjected to prolonged boiling, and chemical changes are brought about by the heat which impair the nutritive value of the milk constituents and impart a peculiar odor and taste, as of cooked milk. Furthermore, prolonged heating of the milk at comparatively high temperatures ruptures the fat-globules and renders the product not only more susceptible to deteriorating chemical changes, but imparts to the same a disagreeable unctuous or greasy taste. Also under such methods of preparation it is found necessary to add a very considerable portion of sugar. Such highly-sweetened condition not only unfits the product for many culinary purposes, but also renders the same highly injurious for use as a diet for infants.

By my improved method of concentrating or condensing milk I entirely dispense with the use of heat and produce an article that is odorless, has an unimpaired natural taste, will keep admirably, and in which the fat-globules are preserved intact, the product being the natural milk minus a large proportion of its water.

In order to avoid the objectionable defects common to condensed milk prepared by the ordinary well-known methods and to obtain a product having the desirable attributes enumerated, I proceed to carry out my invention in the manner following, to wit: The fresh milk is first separated from the cream in the ordinary way by centrifugal action, the cream being reserved and added to the product later on. The skimmed milk is then placed in a suitable centrifugal machine, preferably having a central coil or chamber containing a refrigerating medium, such as ammonia, brine, or the like. The centrifugal machine is then started, and as the freezing action proceeds the watery constituent of the milk is congealed into ice-crystals, which crystals are, by reason of their less specific gravity, displaced by the heavier solids and caused to accumulate about and adhere to the central coil or refrigerating-chamber, the more concentrated milk solution, deprived of a large portion of its water, finding its way to the outer periphery of the drum, whence it may be drawn off in any well-known manner. The product may be withdrawn at an intermediate stage of concentration and subjected to further similar treatment or the exit-valves may be so adjusted as to accomplish the desired high degree of concentration in one and the same continuous treatment by subjecting the contents of the drum to the action of refrigeration and centrifugal separation during a sufficiently-extended space of time. The mass of ice collected about the central refrigerating coil or chamber will in practice contain a certain amount of solid matter locked up between the crystals, varying with the nature of the liquid to be concentrated and the degree of centrifugal force applied. If it be desired to carry to its full extent the concentration of the matter undergoing treatment, the central mass of ice may be melted by the application of heat, as by the admission of steam to the refrigerating-coils, thus freeing any solid particles that may be inclosed within the ice, and then by repeated freezing under the influence of continued centrifugal force accomplish a further concentration. Such alternate freezing, thawing, and freezing may be continued until the solid matter is practically all separated from its watery constituent, when the concentrate may be withdrawn. After the withdrawal of the concentrated product the congealed water in the form of ice may be removed by the application of steam or other convenient form of heat, when the drum will be ready for the condensing of other milk. After the withdrawal of the condensed milk from the apparatus the previously-separated cream is added thereto and the product is ready for use. The condensed milk thus obtained differs from the article as ordinarily produced by evaporation in the particulars hereinbefore stated and may be diluted by the addition of water to the original volume and will then have the taste of fresh milk and will not exhibit the disagreeable odor or the unnatural sweetened taste and flavor of the ordinary condensed milk.

While I have herein described my process as applied to the concentration or condensing of milk as a typical example of its application, I desire it to be distinctly understood that I do not limit myself to the treatment of milk, as my process is obviously valuable in the concentration of a great variety of liquids and solutions, and particularly those containing albumen and other substances which, like milk, are deleteriously affected by the heat in the ordinary process of concentrating by evaporation.

While my process is entirely separate and distinct from any particular form of apparatus adapted to the carying out of the same, yet for the purpose of illustration I have in the annexed drawings shown a preferred form of centrifugal machine in which is supported centrally a coil or a chamber e, adapted to contain the refrigerating solution and which may or may not rotate with the drum, the said chamber or coil being provided with an inlet f and an outlet g, as shown. As hereinbefore fully set out, when the refrigerating medium is admitted to the central coil or chamber and the centrifugal started the watery constituents of the liquid adjacent to said chamber begin to freeze, and the ice-crystals thus formed, because of their specific gravity, will under the influence of the centrifugal action be displaced by the heavier solid constituents and will collect about the central coil or chamber. This centrifugal action will cause the cooled concentrated solution to form and collect adjacent to the wall of the machine or drum, whence it may be drawn off in any well-known manner—as, for instance, through the channels h, leading to an outlet i in the axle b of the centrifugal machine—while the ice remaining may be melted by steam injected into said coils or chambers or applied to the exterior thereof.

In carrying out my process it will be understood that I may use centrifugal machines of various constructions, and I may subject the solution to the freezing medium necessary for the freezing out of the water, as well as to the heating agent necessary for the thawing of the ice, in different ways. The freezing medium, moreover, may consist of any well-known cooling liquid, gas, or the like, and may in some instances be applied directly to the solution.

Having thus fully described my invention, what I claim as new, and desire to secure by Letters Patent, is—

1. The process of treating solutions which consists in freezing out the watery constituents and simultaneously by centrifugal action effecting separation therefrom of the portion containing solids in concentrated form.

2. The process of effecting a concentration of liquids, which consists in subjecting the same simultaneously to a freezing temperature and to centrifugal action thus effecting a removal of the concentrate from the dilute portion.

3. The process of effecting a concentration of liquids, which consists in subjecting the same simultaneously to centrifugal action and to a freezing temperature applied centrally of the mass.

4. The process of condensing milk, which consists in congealing the watery portion by refrigeration and at the same time by centrifugal action effecting a separation therefrom of the portion containing solids.

5. The process of condensing milk, which consists in subjecting the same to centrifugal action and simultaneously submitting the central portion of the same to the influence of a freezing medium.

6. The process of condensing liquid solutions, which consists in alternately freezing and thawing the same while under the influence of centrifugal action.

7. The process of condensing milk, which consists in subjecting the same simultaneously to a freezing temperature and to centrifugal action, then thawing the frozen portion and again freezing while under centrifugal action.

8. The process of condensing milk, which consists in removing therefrom the cream, then freezing out the watery constituent and simultaneously by centrifugal action effecting a separation therefrom of the concentrate, and then adding to the concentrate the cream previously removed.

9. The process of producing condensed milk, which consists in removing therefrom the cream, alternately freezing and thawing the milk while under the influence of continued centrifugal action, and then adding the cream to the condensed product.

In witness whereof I have hereunto set my hand in presence of two witnesses.

AUGUST GÜRBER.

Witnesses:
HANS HUNGER,
OSCAR BOCK.